United States Patent
Zeng et al.

(10) Patent No.: US 9,933,557 B2
(45) Date of Patent: Apr. 3, 2018

(54) BACKLIGHT MODULES AND LIQUID CRYSTAL DEVICES (LCDS)

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Jie Zeng, Guangdong (CN); Gege Zhou, Guangdong (CN); Chen Xie, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 232 days.

(21) Appl. No.: 14/891,740

(22) PCT Filed: Apr. 16, 2015

(86) PCT No.: PCT/CN2015/076729
§ 371 (c)(1),
(2) Date: Nov. 17, 2015

(87) PCT Pub. No.: WO2016/161667
PCT Pub. Date: Oct. 13, 2016

(65) Prior Publication Data
US 2017/0045671 A1   Feb. 16, 2017

(30) Foreign Application Priority Data
Apr. 9, 2015 (CN) .......................... 2015 1 0166146

(51) Int. Cl.
*G02B 6/00* (2006.01)
*F21V 8/00* (2006.01)

(52) U.S. Cl.
CPC ......... *G02B 6/0055* (2013.01); *G02B 6/0065* (2013.01); *G02B 6/0088* (2013.01)

(58) Field of Classification Search
CPC .. G02B 6/0088; G02B 6/0055; G02B 6/0065; G02B 6/0086; G02B 6/0093; F21V 29/505
(Continued)

(56) References Cited

U.S. PATENT DOCUMENTS 5,497,293 A * 3/1996 Noguchi ............... F21V 17/104
362/23.15
7,780,333 B2 * 8/2010 Hsu .................... G02F 1/133606
349/58
(Continued)

*Primary Examiner* — Julie Bannan
(74) *Attorney, Agent, or Firm* — Andrew C. Cheng

(57) ABSTRACT

A backlight module and a liquid crystal device (LCD) are disclosed. The backlight module includes a light guiding plate, a plastic frame adjacent to a lateral side of the light guiding plate, and a reflective sheet. The reflective sheet includes a first portion, a second portion, and a third portion. The first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, and the third portion of the reflective sheet adheres to a top surface of the plastic frame. With such configuration, the reflective sheet may be stably fixed on the plastic frame to prevent the reflective sheet from being detached.

9 Claims, 3 Drawing Sheets

(58) Field of Classification Search
USPC .......................................................... 362/624
See application file for complete search history.

(56) References Cited

U.S. PATENT DOCUMENTS

| | | | |
|---|---|---|---|
| 7,876,398 B2* | 1/2011 | Fukuda | G02F 1/133308 349/58 |
| 7,894,014 B2* | 2/2011 | Kawase | G02F 1/133603 349/112 |
| 8,228,462 B2* | 7/2012 | Sasaki | G02B 5/02 349/58 |
| 2003/0189821 A1* | 10/2003 | Moon | G02B 6/0021 362/609 |
| 2005/0002172 A1* | 1/2005 | Han | G02B 5/0242 362/627 |
| 2005/0018416 A1* | 1/2005 | Amaya | G02B 6/0093 362/613 |
| 2005/0073855 A1* | 4/2005 | Wang | F21V 29/83 362/558 |
| 2005/0099806 A1* | 5/2005 | Tsai | F21V 29/83 362/218 |
| 2008/0088764 A1* | 4/2008 | Son | G02B 6/0086 349/58 |
| 2008/0304288 A1* | 12/2008 | Iwasaki | F21V 29/02 362/632 |
| 2009/0091688 A1* | 4/2009 | Tanaka | G02F 1/133605 349/65 |
| 2009/0161036 A1* | 6/2009 | Cho | G02F 1/133605 349/62 |
| 2009/0207334 A1* | 8/2009 | Kim | G02F 1/133606 349/58 |
| 2012/0224394 A1* | 9/2012 | Zhang | G02F 1/133308 362/632 |
| 2012/0268951 A1* | 10/2012 | Li | G02F 1/133608 362/353 |
| 2013/0120669 A1* | 5/2013 | Kuromizu | G02B 6/0033 348/790 |
| 2014/0301104 A1* | 10/2014 | Lan | G02B 6/0088 362/607 |
| 2015/0098026 A1* | 4/2015 | Kasai | G02F 1/133308 348/794 |
| 2015/0219964 A1* | 8/2015 | Park | G02F 1/133605 349/64 |
| 2016/0033821 A1* | 2/2016 | Yasuda | G02F 1/133603 349/58 |
| 2016/0370527 A1* | 12/2016 | Chang | G02B 6/005 |
| 2017/0038522 A1* | 2/2017 | Zeng | G02B 6/0051 |

* cited by examiner

BACKLIGHT MODULES AND LIQUID CRYSTAL DEVICES (LCDS)

BACKGROUND OF THE INVENTION

1. Field of the Invention

The present disclosure relates to liquid crystal display technology, and more particularly to a backlight module and a LCD.

2. Discussion of the Related Art

Currently, LCDs have been widely adopted ad display devices in a variety of electronic device. Due to the thin and light trend, borders of the electronic devices are designed to be as narrow as possible. However, the backlight module is one key component of LCDs, the border of the backlight module also bounds to the narrow border design.

The reflective sheet within the backlight module is usually adhered to a bottom surface of the plastic frame via double-sided adhesive. As the width of the plastic frame has been gradually narrow, the dimension of the bonding surface between the reflective sheet and the plastic frame has been decreased, which reduces the bonding strength of the double-sided adhesive between the plastic frame and the reflective sheet. As such, the bonding between the reflective sheet and the plastic frame is not stable, and thus the reflective sheet may be detached.

SUMMARY

The object of the invention is to provide a backlight module and a LCD for stably fixing the reflective sheet on the plastic frame so as to prevent the reflective sheet from being detached.

In one aspect, a backlight module includes: a light guiding plate; a plastic frame adjacent to a lateral side of the light guiding plate; at least one optical film arranged above a top of the light guiding plate; a reflective sheet including a first portion, a second portion, and a third portion, the first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, the third portion of the reflective sheet adheres to a top surface of the plastic frame, the second portion of the reflective sheet adheres to the lateral side of the plastic frame facing away from the light guiding plate by adhesive technology, a surface of the third portion of the reflective sheet facing toward the top surface of the plastic frame includes a plurality of openings, the top surface of the plastic frame includes a plurality of corresponding protrusions, during an assembling process, the protrusions of the top surface of the plastic frame engage with the openings of the third portion of the reflective sheet such that the third portion of the reflective sheet is fastened on the top surface of the plastic frame and the optical film by the adhesive technology.

Wherein the second portion of the reflective sheet adheres to the lateral side of the plastic frame facing away the light guiding plate via double-sided adhesive, the third portion of the reflective sheet adheres to the top surface of the plastic frame and the optical film via double-sided adhesive.

Wherein the first portion of the reflective sheet adheres to the bottom of the light guiding plate and/or the bottom of the plastic frame via adhesive technology.

Wherein the surface of the third portion of the reflective sheet facing toward the top surface of the plastic frame adheres to the top surface of the plastic frame and the optical film via double-sided adhesive, and the other surface of the third portion facing away the top surface of the plastic frame is coated with an adhesive layer to adhere the protrusions of the top surface of the plastic frame to the openings of the third portion of the reflective sheet.

Wherein the second portion of the reflective sheet is adhered to the lateral side of the plastic frame facing away the light guiding plate via the double-sided adhesive.

Wherein the first portion of the reflective sheet adheres to the bottom of the light guiding plate and/or the bottom of the plastic frame 130 via the double-sided adhesive.

In another aspect, a backlight module includes: a light guiding plate; a plastic frame adjacent to a lateral side of the light guiding plate; and a reflective sheet including a first portion, a second portion, and a third portion, the first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, and the third portion of the reflective sheet adheres to a top surface of the plastic frame.

Wherein the backlight module further includes at least one optical film arranged above a top of the light guiding plate.

Wherein the second portion of the reflective sheet adheres to the lateral side of the plastic frame facing away the light guiding plate via adhesive technology, and the third portion of the reflective sheet adheres to the top surface of the plastic frame and the optical film via the adhesive technology.

Wherein the second portion of the reflective sheet adheres to the lateral side of the plastic frame facing away the light guiding plate via double-sided adhesive, and the third portion of the reflective sheet adheres to the top surface of the plastic frame and the optical film via the double-sided adhesive.

Wherein the first portion of the reflective sheet adheres to the bottom of the light guiding plate and/or the bottom of the plastic frame via adhesive technology.

Wherein a surface of the third portion of the reflective sheet facing toward the top surface of the plastic frame includes a plurality of openings, the top surface of the plastic frame includes a plurality of corresponding protrusions, during an assembling process, and the protrusions of the top surface of the plastic frame engage with the openings of the third portion of the reflective sheet.

Wherein the surface of the third portion of the reflective sheet facing toward the top surface of the plastic frame adheres to the top surface of the plastic frame and the optical film via double-sided adhesive, and the other surface of the third portion facing away the top surface of the plastic frame is coated with an adhesive layer to adhere the protrusions of the top surface of the plastic frame to the openings of the third portion of the reflective sheet.

Wherein the second portion of the reflective sheet is adhered to the lateral side of the plastic frame facing away the light guiding plate via the double-sided adhesive.

Wherein the first portion of the reflective sheet adheres to the bottom of the light guiding plate and/or the bottom of the plastic frame 130 via the double-sided adhesive.

In another aspect, a LCD including any one of the above backlight module.

In view of the above, the reflective sheet includes a first portion, a second portion, and a third portion. The first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, and the third portion of the reflective sheet adheres to a top surface of the plastic frame. As the reflective sheet includes the three portions, such that the reflective sheet not only adheres to the bottom of the plastic frame, but also adheres to the lateral side of the light guiding plate facing away the plastic frame and the top surface of the plastic frame. With such configuration, even though the border of the plastic frame is narrow, the reflective sheet may be stably adhered to the plastic frame so as to prevent the reflective sheet from being detached.

DETAILED DESCRIPTION OF THE EMBODIMENTS

Embodiments of the invention will now be described more fully hereinafter with reference to the accompanying drawings, in which embodiments of the invention are shown.

Figure 1:
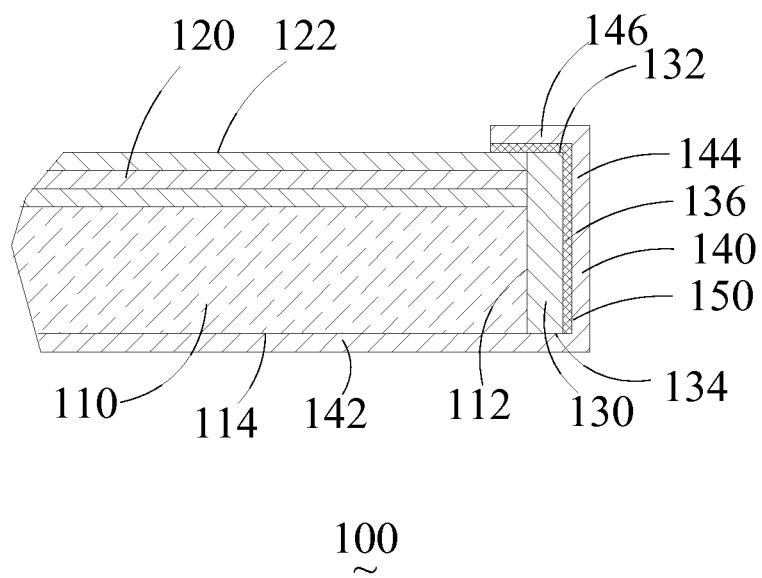
FIG. 1 is a cross-sectional view of the backlight module in accordance with one embodiment.

Referring to FIG. 1, the backlight module 100 includes a light guiding plate 110, a plastic frame 130, and a reflective sheet 140.

The light guiding plate 110 is configured for converting the dot light source or line light source from lamps to a surface light source. The light guiding plate 110 may be made by any conventional material of the light guiding plate, such as optical grade acrylic.

The plastic frame 130 is arranged to be adjacent to a lateral side 112 of the light guiding plate 110. The plastic frame 130 supports and protects the light guiding plate 110.

The reflective sheet 140 includes a first portion 142, a second portion 144, and a third portion 146. The first portion 142 of the reflective sheet 140 is arranged below a bottom 114 of the light guiding plate 110 and/or a bottom 134 of the plastic frame 130. The second portion 144 of the reflective sheet 140 adheres to a lateral side 136 of the plastic frame 130, and the lateral side 136 is facing away from the light guiding plate 110. The third portion 146 of the reflective sheet 140 adheres to a top surface 132 of the plastic frame 130.

Comparing to the conventional configuration, the reflective sheet 140 includes the first portion 142, the second portion 144, and the third portion 146. The first portion 142 of the reflective sheet 140 is arranged below a bottom 114 of the light guiding plate 110 and/or a bottom 134 of the plastic frame 130. The second portion 144 of the reflective sheet 140 adheres to a lateral side 136 of the plastic frame 130, and the lateral side 136 faces away from the light guiding plate 110. The third portion 146 of the reflective sheet 140 adheres to a top surface 132 of the plastic frame 130. As the reflective sheet 140 includes the three portions. As such, the reflective sheet 140 not only adheres to the bottom 134 of the plastic frame 130, but also adheres to the lateral side 136 of the plastic frame 130 and the top surface 132 of the plastic frame 130. In this way, even though the width of the plastic frame 130 is narrow, the reflective sheet 140 may be stably fixed on the plastic frame 130 to prevent the reflective sheet 140 from being detached.

Further, the backlight module 100 includes at least one optical film 120 arranged above the top of the light guiding plate 110. The top is opposite to the bottom 114 of the light guiding plate 110.

The second portion 144 of the reflective sheet 140 adheres to the lateral side 136 of the plastic frame 130 by adhesive technology, and the third portion 146 of the reflective sheet 140 also adheres to the top surface 132 of the plastic frame 130 via the adhesive technology.

Furthermore, the third portion 146 of the reflective sheet 140 adheres to the top surface 132 of the plastic frame 130 and the optical film 120. Specifically, the third portion 146 of the reflective sheet 140 adheres to the top surface 132 of the plastic frame 130 and the a top surface 122 of the optical film 120.

The adhesive technology relates to bonding two different objects with adhesive materials. The adhesive technology is not limited to a coated glue layer or adhesive double-sided adhesive.

In the embodiment, the second portion 144 of the reflective sheet 140 adheres to the lateral side 136 of the plastic frame 130 via double-sided adhesive 150, and the third portion 146 of the reflective sheet 140 adheres to the top surface 132 of the plastic frame 130 and the optical film 120 via the double-sided adhesive 150.

Figure 2:
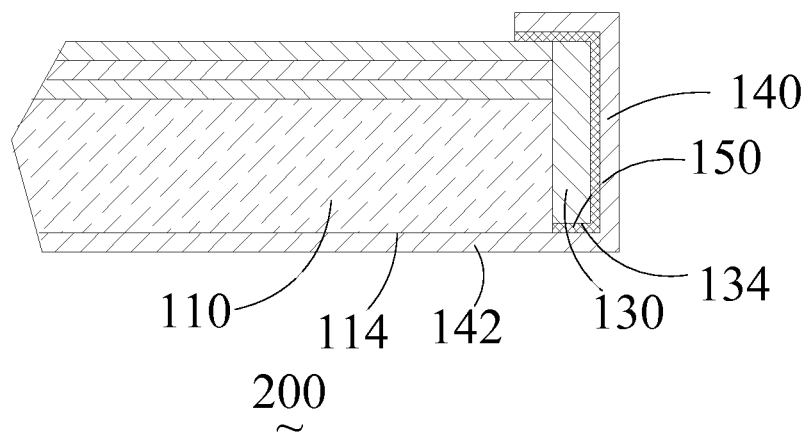
FIG. 2 is a cross-sectional view of the backlight module in accordance with another embodiment.

FIG. 2 is a cross-sectional view of the backlight module in accordance with another embodiment. The first portion 142 of the reflective sheet 140 may adhere to the bottom 114 of the light guiding plate 110 and/or the bottom 134 of the plastic frame 130 via adhesive technology. The adhesive technology is not limited to a coated glue layer or adhesive double-sided adhesive. In the embodiment, the adhesive technology relates to the double-sided adhesive 150.

Comparing to the conventional solution, the first portion 142, the second portion 144, the third portion 146 of the reflective sheet 140 adhere to the corresponding locations of the plastic frame 130 via the adhesive technology such that the reflective sheet 140 may be stably adhere to the plastic frame 130, and thus the reflective sheet 140 is prevented from being detached. Further, the backlight module 100 also includes the optical film 120. The third portion 146 of the reflective sheet 140 also adheres to the optical film 120 via adhesive technology such that the optical film 120 is fixed within the plastic frame 130. In addition, an area where the reflective sheet 140 overlaps with the optical film 120 may reflect back the leaked light beams to enhance the light efficiency.

Figure 3:
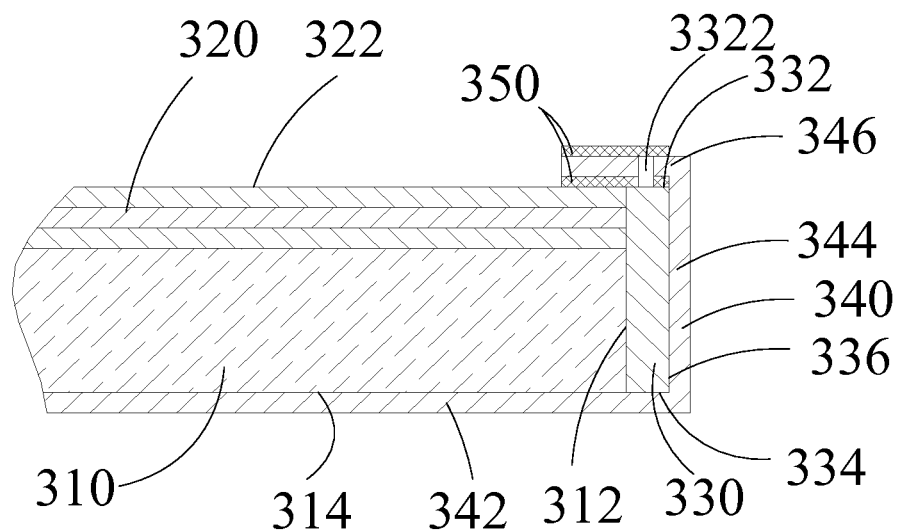
FIG. 3 is a cross-sectional view of the backlight module in accordance with one embodiment.
Figure 4:
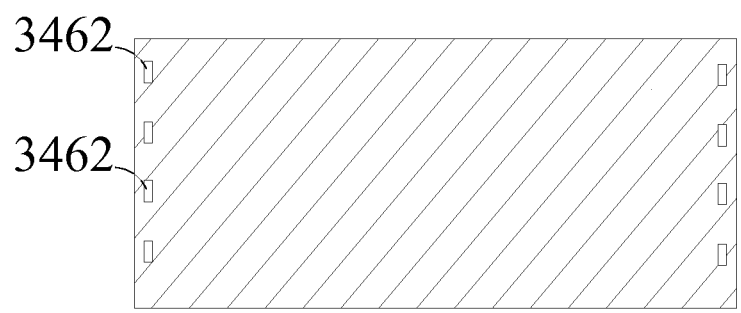
FIG. 4 is a schematic view of the third portion of the reflective sheet of FIG. 3.
Figure 5:
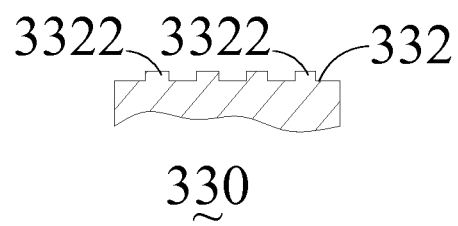
FIG. 5 is a schematic view showing the top of the plastic frame of FIG. 3.

FIGS. 3-5 relate to another embodiment of the pull-up maintaining unit 300 having a light guiding plate 310, a plastic frame 330, and a reflective sheet 340. The light guiding plate 310 and the plastic frame 330 in this embodiment are the same with the light guiding plate 110 and the plastic frame 130 in the above embodiment.

The reflective sheet 340 includes a first portion 342, a second portion 344, and a third portion 346. The bonding locations of the first portion 342 and the second portion 344 are similar to that of the first portion 142 and the second portion 144 of the second portion 144 of the backlight module 100.

The difference resides in that the surface of the third portion 346 of the reflective sheet 340 facing toward the top surface 332 of the plastic frame 330 includes a plurality of openings 3462. The top surface 332 of the plastic frame 330 includes a plurality of corresponding protrusions 3322.

During an assembling process, the protrusions 3322 of the top surface 332 of the plastic frame 330 engage with the openings 3462 of the third portion 346 of the reflective sheet 340 such that the third portion 346 of the reflective sheet 340 may be fastened on the top surface 332 of the plastic frame 330.

In this embodiment, the reflective sheet 340 of the plastic frame 330 not only adheres to the bottom 334 of the plastic frame 330, but also adheres to the lateral side 336 of the plastic frame 330 and the top surface 332 of the plastic frame 330. Even though the width of the plastic frame 330 is narrow, the reflective sheet 340 may be stably fixed on the plastic frame 330 to prevent the reflective sheet 340 from being detached. In addition, the openings 3462 of the third portion 346 of the reflective sheet 340 and the protrusions 3322 of the top surface 332 of the plastic frame 330 may be fastened together such that the reflective sheet 340 may be stably fixed with the plastic frame 330.

Further, the pull-up maintaining unit 300 includes at least one optical film 320 arranged on a surface opposite to the bottom 314 of the light guiding plate 310.

Further, the surface of the third portion 346 of the reflective sheet 340 facing toward the top surface 332 of the plastic frame 330 may be adhered to the top surface 332 of the plastic frame 330 via the adhesive technology. The adhesive technology relates to bonding two different objects with adhesive materials. The adhesive technology is not limited to a coated glue layer or adhesive double-sided adhesive.

Further, the surface of the third portion 346 of the reflective sheet 340 facing toward the top surface 332 of the plastic frame 330 may be adhered to the top surface 332 of the plastic frame 330 and the optical film 320 via the adhesive technology. Specifically, the surface of the third portion 346 of the reflective sheet 340 facing toward the top surface 332 of the plastic frame 330 may adhere to the top surface 332 of the plastic frame 330 and the top surface 322 of the optical film 320 via the adhesive technology. The adhesive technology relates to bonding two different objects with adhesive materials. The adhesive technology is not limited to a coated glue layer or adhesive double-sided adhesive.

It can be understood that a surface of the third portion 346 facing away the top surface 332 of the plastic frame 330 may be coated with an adhesive layer to adhere the protrusions 3322 of the top surface 332 of the plastic frame 330 to the openings 3462 of the third portion 346 of the reflective sheet 340, which may prevent the reflective sheet 340 from being detached. Alternatively, the surface of the third portion 346 facing away the top surface 332 of the plastic frame 330 may be adhered with the double-sided adhesive 350. In one aspect, the protrusions 3322 arranged on the top surface 332 of the plastic frame 330 are adhered to the openings 3462 of the third portion 346 of the reflective sheet 340. In another aspect, the backlight module may be adhered to other components, such as liquid crystal panel, by another side of the double-sided adhesive 350.

Further, the second portion 344 of the reflective sheet 340 is adhered to the lateral side 336 of the plastic frame 330 via the adhesive technology. The adhesive technology is not limited to a coated glue layer or adhesive double-sided adhesive.

Furthermore, the first portion 342 of the reflective sheet 340 may be adhered to the bottom 314 of the light guiding plate 310 and/or the bottom 334 of the plastic frame 330. The adhesive technology is not limited to a coated glue layer or adhesive double-sided adhesive.

Comparing to the conventional configuration, the first portion 342, the second portion 344, the third portion 346 of the reflective sheet 340 adhere to the corresponding locations of the plastic frame 330 via the adhesive technology such that the reflective sheet 340 may be stably adhere to the plastic frame 330, and thus the reflective sheet 340 is prevented from being detached even the external force is strong.

Further, the backlight module 300 also includes the optical film 320. The third portion 346 of the reflective sheet 340 also adheres to the optical film 320 via adhesive technology such that the optical film 320 is fixed within the plastic frame 330. In addition, an area where the reflective sheet 340 overlaps with the optical film 320 may reflect back the leaked light beams to enhance the light efficiency.

It can be understood that the top surface of the plastic frame may only include one protrusion, and the third portion of the reflective sheet is configured to include only one opening correspondingly.

It can be understood that the top surface of the plastic frame and the third portion of the reflective sheet may be configured to include components other than protrusion and openings. For instance, hooks and fastening hole, or other components, capable of engaging the top surface of the plastic frame and the third portion of the reflective sheet may be adopted.

In present disclosure, a LCD includes any one of the above backlight module.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a light guiding plate;
   a plastic frame adjacent to a lateral side of the light guiding plate;
   at least one optical film arranged above a top of the light guiding plate;
   a reflective sheet comprising a first portion, a second portion, and a third portion, the first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, the third portion of the reflective sheet adheres to a top surface of the plastic frame, the second portion of the reflective sheet adheres to the lateral side of the plastic frame facing away from the light guiding plate by adhesive material, a surface of the third portion of the reflective sheet facing toward the top surface of the plastic frame comprises a plurality of openings, the top surface of the plastic frame comprises a plurality of corresponding protrusions, during an assembling process, the protrusions of the top surface of the plastic frame engage with the openings of the third portion of the reflective sheet such that the third portion of the reflective sheet is adhered to the top surface of the plastic frame and the optical film by adhesive material.

2. The backlight module as in claim 1, wherein the second portion of the reflective sheet adheres to the lateral side of the plastic frame facing away the light guiding plate via double-sided adhesive, the third portion of the reflective sheet adheres to the top surface of the plastic frame and the optical film via double-sided adhesive.

3. The backlight module as claimed in claim 1, wherein the first portion of the reflective sheet adheres to the bottom of the light guiding plate and/or the bottom of the plastic frame.

4. The backlight module as claimed in claim 1, wherein the surface of the third portion of the reflective sheet facing toward the top surface of the plastic frame adheres to the top surface of the plastic frame and the optical film via double-sided adhesive, and the other surface of the third portion facing away the top surface of the plastic frame is coated with an adhesive layer to adhere the protrusions of the top surface of the plastic frame to the openings of the third portion of the reflective sheet.

5. The backlight module as claimed in claim 4, wherein the second portion of the reflective sheet is adhered to the lateral side of the plastic frame facing away the light guiding plate via the double-sided adhesive.

6. The backlight module as claimed in claim 5, wherein the first portion of the reflective sheet adheres to the bottom of the light guiding plate and/or the bottom of the plastic frame via the double-sided adhesive.

7. A backlight module, comprising:
a light guiding plate;
a plastic frame adjacent to a lateral side of the light guiding plate; and
a reflective sheet comprising a first portion, a second portion, and a third portion, the first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, and the third portion of the reflective sheet adheres to a top surface of the plastic frame;
at least one optical film arranged above a top of the light guiding plate;
wherein the second portion of the reflective sheet adheres to the lateral side of the plastic frame facing away the light guiding plate via double-sided adhesive, and the third portion of the reflective sheet adheres to the top surface of the plastic frame and the optical film via the double-sided adhesive,
wherein the first portion of the reflective sheet adheres to the bottom of the light guiding plate and/or the bottom of the plastic frame;
wherein a surface of the third portion of the reflective sheet facing toward the top surface of the plastic frame comprises a plurality of openings, the top surface of the plastic frame comprises a plurality of corresponding protrusions, during an assembling process, and the protrusions of the top surface of the plastic frame engage with the openings of the third portion of the reflective sheet.

8. The backlight module as claimed in claim 7, wherein the surface of the third portion of the reflective sheet facing toward the top surface of the plastic frame adheres to the top surface of the plastic frame and the optical film via double-sided adhesive, and the other surface of the third portion facing away the top surface of the plastic frame is coated with an adhesive layer to adhere the protrusions of the top surface of the plastic frame to the openings of the third portion of the reflective sheet.

9. A liquid crystal device (LCD), comprising:
a backlight module comprising:
a light guiding plate;
a plastic frame adjacent to a lateral side of the light guiding plate; and
a reflective sheet comprising a first portion, a second portion, and a third portion, the first portion of the reflective sheet is arranged below a bottom of the light guiding plate and/or a bottom of the plastic frame, the second portion of the reflective sheet adheres to a lateral side of the plastic frame, and the lateral side faces away from the light guiding plate, and the third portion of the reflective sheet adheres to a top surface of the plastic frame;
at least one optical film arranged above a top of the light guiding plate;
wherein the second portion of the reflective sheet adheres to the lateral side of the plastic frame facing away the light guiding plate via double-sided adhesive, and the third portion of the reflective sheet adheres to the top surface of the plastic frame and the optical film via the double-sided adhesive,
wherein the first portion of the reflective sheet adheres to the bottom of the light guiding plate and/or the bottom of the plastic frame;
wherein a surface of the third portion of the reflective sheet facing toward the top surface of the plastic frame comprises a plurality of openings, the top surface of the plastic frame comprises a plurality of corresponding protrusions, during an assembling process, and the protrusions of the top surface of the plastic frame engage with the openings of the third portion of the reflective sheet.

\* \* \* \* \*